US009274950B2

(12) United States Patent
Graefe (10) Patent No.: US 9,274,950 B2
(45) Date of Patent: Mar. 1, 2016

(54) DATA RESTRUCTURING IN MULTI-LEVEL MEMORY HIERARCHIES

(75) Inventor: Goetz Graefe, Madison, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 864 days.

(21) Appl. No.: 12/461,842

(22) Filed: Aug. 26, 2009

(65) Prior Publication Data

US 2011/0055232 A1    Mar. 3, 2011

(51) Int. Cl.
*G06F 17/30*     (2006.01)
*G06F 12/08*     (2006.01)

(52) U.S. Cl.
CPC ..................... *G06F 12/08* (2013.01)

(58) Field of Classification Search
CPC ............ G06F 17/30519; G06F 17/30867; G06F 17/30091; G06F 17/30699; G06F 17/30702; G06F 12/08
See application file for complete search history.

(56) References Cited

U.S. PATENT DOCUMENTS

| | | | |
|---|---|---|---|
| 6,105,024 A * | 8/2000 | Graefe et al. | 707/999.007 |
| 6,578,110 B1 * | 6/2003 | Ohba | 711/119 |
| 6,598,044 B1 | 7/2003 | Waas et al. | |
| 6,708,164 B1 | 3/2004 | Cseri et al. | |
| 6,748,391 B1 | 6/2004 | Schwerdtfeger et al. | |
| 7,444,321 B2 | 10/2008 | Cseri et al. | |
| 7,454,420 B2 * | 11/2008 | Ray et al. | 707/999.001 |
| 7,496,711 B2 * | 2/2009 | Bartley et al. | 711/117 |

OTHER PUBLICATIONS

Graefe, Goetz, "The five-minute rule twenty years later and how flash memory changes the rules", 2007, ACM, pp. 1-9.*
NavigationOvs. Index-Based XML Multi-Query Processing, Bruno/Gravano, Columbia University and Koudas/Srivastava, AT&T Labs-Research.
Sorting Hiearchical Data in External Memory, Koltsidas/Muller/Viglas, School of Informatics, University of Edinburgh.

* cited by examiner

*Primary Examiner* — Dinku Gebresenbet
(74) *Attorney, Agent, or Firm* — Brooks, Cameron & Huebsch, PLLC (57) ABSTRACT

A method, executed on a suitably programmed processor, provides for ordering records using a memory hierarchy. The memory hierarchy includes and two or more lower levels of the memory hierarchy. The method includes the steps of (a) receiving unsorted input records; (b) reading the input records in pages and writing one or more pages of the input records to the primary memory; (c) sorting the pages of input records to create a run; (d) if a size of the run exceeds primary memory capacity, moving data that just exceeds the primary memory capacity to a secondary level of the memory hierarchy; (e) repeating steps (a)-(d) until either (i) all unsorted input records have been read into primary memory and sorted, or (ii) a capacity of the secondary level of the memory hierarchy is exceeded; (f) following step (e)(ii), moving data that just exceeds the secondary memory capacity from the secondary level to a tertiary level of the memory hierarchy until the capacity of the secondary level no longer is exceeded; and (g) following either of steps (c), (e)(i), or (f), merging runs to create a merge output.

20 Claims, 9 Drawing Sheets

DATA RESTRUCTURING IN MULTI-LEVEL MEMORY HIERARCHIES

BACKGROUND

Many data query operations employ some type of sorting operation. Sorting is the process of arranging items in a specific order. The items may have an associated key value that is used in the sorting operation. The sorting objective is to determine a permutation of records that puts the keys in the specified order, e.g., non-decreasing. A sorting operation is characterized by the manner by which the sorting, or rearrangement is accomplished, as well as whether the rearrangement can be accomplished entirely within a single layer of memory (e.g., the internal memory local to the processor executing the sorting operation).

A distribution sort separates records into contiguous ranges so that all records in a range have keys that are less in value than the keys of the records in the next range. A merge sort combines two or more linearly-ordered lists such that the combined list also is linearly ordered.

In some situations, internal memory capacity may not be sufficient to accommodate the sorting operation, and additional operations are required. An external sort refers to a sorting technique applicable to situations in which the records to be sorted exceed the processor's internal memory and another layer of memory may be required. In an external merge-sort, parts of a file are read into the internal memory, ordered (sorted), then rewritten to an external or secondary storage, and finally merged.

DESCRIPTION OF THE DRAWINGS

The detailed description will refer to the following drawings in which like numbers refer to like objects, and in which.

DETAILED DESCRIPTION

Sorting is the process of ordering items based on specified criteria. In data processing, sorting sequences records using a key value determined for each record. If a group of records is too large to be sorted within available memory (e.g., RAM), then a two-phase process, referred to as external sorting, may be used. In the first phase of the external sorting process, a portion of the records is sorted and the partial result, referred to as a run, is stored to temporary external storage. This form of sorting uses a hierarchical memory system having at least two layers. One such layer (internal) may be RAM, and the other layer (external) may be a disk.

Sorted runs are generated until the entire group of records is exhausted. Then, in the second phase of the external sorting process, the sorted runs are merged, typically to a final output record group. If all of the sorted runs cannot be merged in one pass, then the second phase may be executed multiple times in a process commonly referred to as a multi-pass or multi-phase merge. In a multi-phase merge, existing runs are merged to create a new, smaller set of larger runs.

The records within a sorted run are written to external storage in sequential blocks of data, such that each block includes an integral number of records. Any merging process can be affected by the size of the record block. For example, when sorting randomly ordered records, poor merge performance may result from the selection of small block size because disk latency, which may be orders of magnitude larger than any other delay (e.g., memory access latency) encountered during merging, can dominate processing time. One method of increasing merge performance is to establish a large block size so that access costs (i.e., time spent locating the blocks) are insignificant compared to transfer costs (i.e., time spent reading/writing the blocks). However, a large block size may also decrease performance by requiring in a multi-pass merge and, consequently, increased processing time and increased temporary storage requirements.

In a memory hierarchy that includes RAM and an external disk, an algorithm generates run files to fill an allocated memory space with records, sorts the records using an in-memory sort algorithm, and then writes the sorted records to disk as a run file. These steps are repeated until all input records have been processed and written to run files. If the entire input fits into the allocated memory space, only an "in-memory run" is created, and the final output is produced directly after the first invocation of the in-memory sort algorithm. If the set of input records is larger than the allocated memory space, the sort operation may write the entire set of input records to multiple run files on disk, and, then merge the run files to produce the final sorted output.

An alternative run formation strategy employs a replacement selection algorithm that repeatedly selects the next record (in sort order) to be written to the run file that is currently being formed. Once the selected record is written to a run file, it is immediately replaced in memory by another record from the input. Thus, the allocated memory space is always full. The record selected from among all the records stored in the allocated memory space is the one with the lowest key, as long as that key is no lower than the key most recently written. If there is no key in memory higher than or equal to the one just written, a new run is begun with the lowest key in memory.

To improve the performance of the merge-sort operation, the memory hierarchy may be expanded by adding additional layers, such as flash memory. Flash memory falls between traditional RAM technology and traditional disks drives in terms of access time, transfer bandwidth, cost per megabyte, and cost per access per second. RAM provides the fastest access time but the lowest transfer bandwidth and highest cost per megabyte. Disk drives have low costs per megabyte, good transfer bandwidth, but low access times. Accordingly, a memory hierarchy that includes both RAM and disk drives may be expanded to take advantage of characteristics of other memory types.

To further increase the performance of the merge-sort operation, two additional steps may be taken. First, the size (quantity) of data moved from one memory level to another is set to take advantage of the transfer bandwidth and data access latencies of the memory layers. For example, if a memory level provides for fast data access latency, the data may be moved as small pages of data.

Second, when forming runs on a memory level, when a capacity of that level has been or will be reached, rather than transfer all of the data in the memory level to a next (lower) memory level, only that amount of data necessary to just prevent exceeding the memory capacity need be moved.

Figure 1:
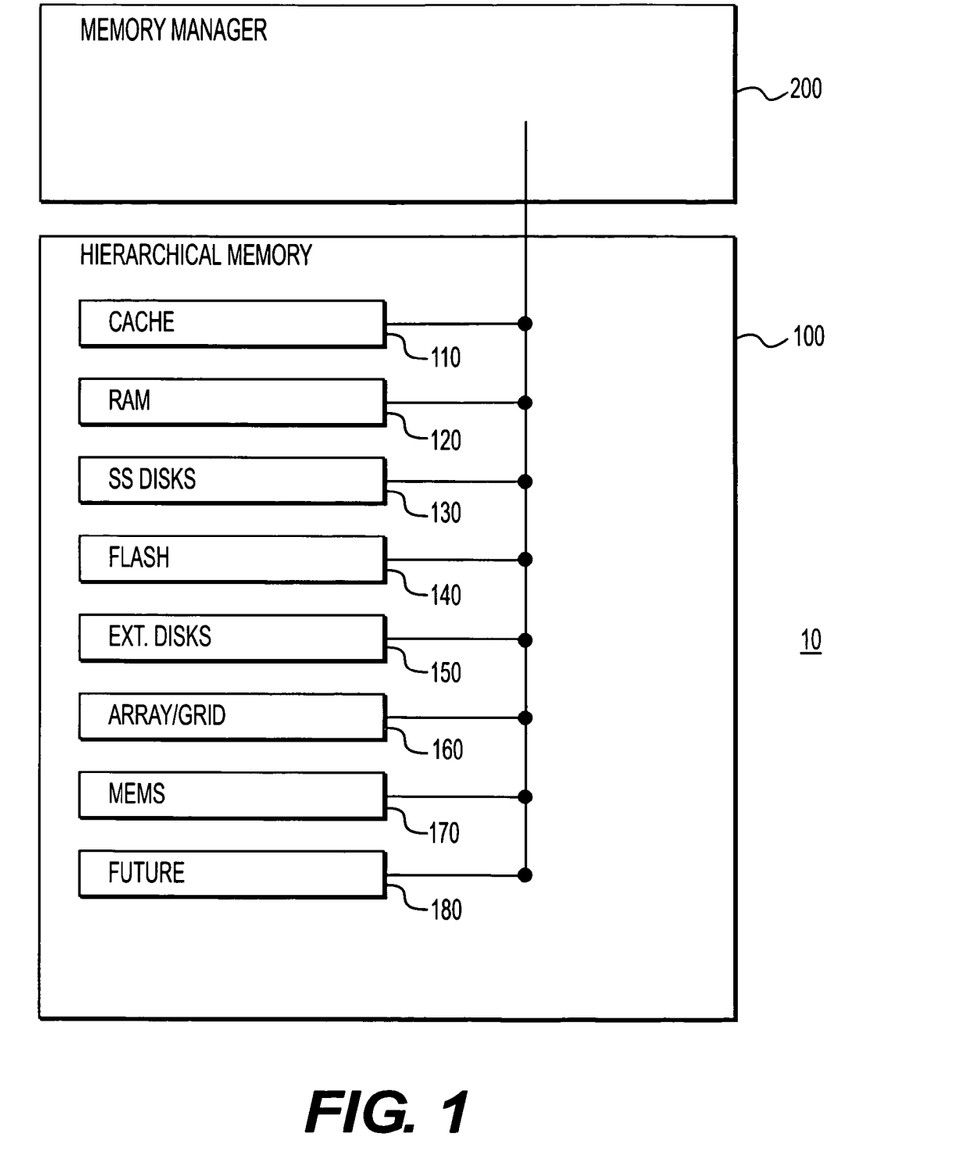
FIG. 1 illustrates an exemplary memory system, including a memory hierarchy in which query processing is implemented.

FIG. 1 illustrates an exemplary memory system 10 having a memory hierarchy 100 in which query processing across the various hierarchical layers is implemented. The memory system 10 includes a memory management system 200. The memory hierarchy 100 includes private and shared CPU caches 110, local and remote RAM 120, volatile solid-state disks 130, NOR and NAND flash memory 140, high-performance "enterprise" disks and high-capacity "tape replacement" disks 150, disk array and grid storage 160, as well as more advanced storage technologies such as MEMOS devices 170, and future storage technologies 180. The detailed description that follows will focus on a merge-sort process that may be applied to three specific layers of the memory hierarchy, namely RAM 120, flash memory 140, and disks 150.

Flash memory and disks differ by a small factor in their transfer bandwidths, but by orders of magnitude in their access latencies. To account for these differences, a computer architect might choose page size such that access latency and transfer time are equal, as this choice guarantees that all access patterns from random access to sequential scan perform within a factor of two of the optimum. For a traditional SATA disk with 150 megabyte/second (MB/s) transfer bandwidth and 10 millisecond (ms) access latency (seek+rotation), this page size is 1½ MB, whereas for flash memory with a SATA interface, the calculation might be 40 MB/s×0.1 ms=4 kilobyte (KB) page size. The decision to optimize page size to roughly equalize access latency and transfer time leads to optimal page sizes for flash memory and disk that differ by a substantial factor.

The memory management system 200 associated with the memory hierarchy 100 of FIG. 1 may be installed on a CPU. The system 200 implements merge-sort processing using flash memory and traditional disks, but enables generalization in two directions. First, a merge-sort algorithm is a representative for query processing algorithms, in particular an external merge-sort algorithm, that includes distribution sort and hash-based query execution algorithms. Second, a three-level memory hierarchy of RAM, flash memory, and disk is a representative for even deeper hierarchies. That is, the description that follows, while focusing on RAM, flash memory, and disks, can be extended to the entire memory hierarchy 100, including all eight layers illustrated, or even more layers.

Figure 2:
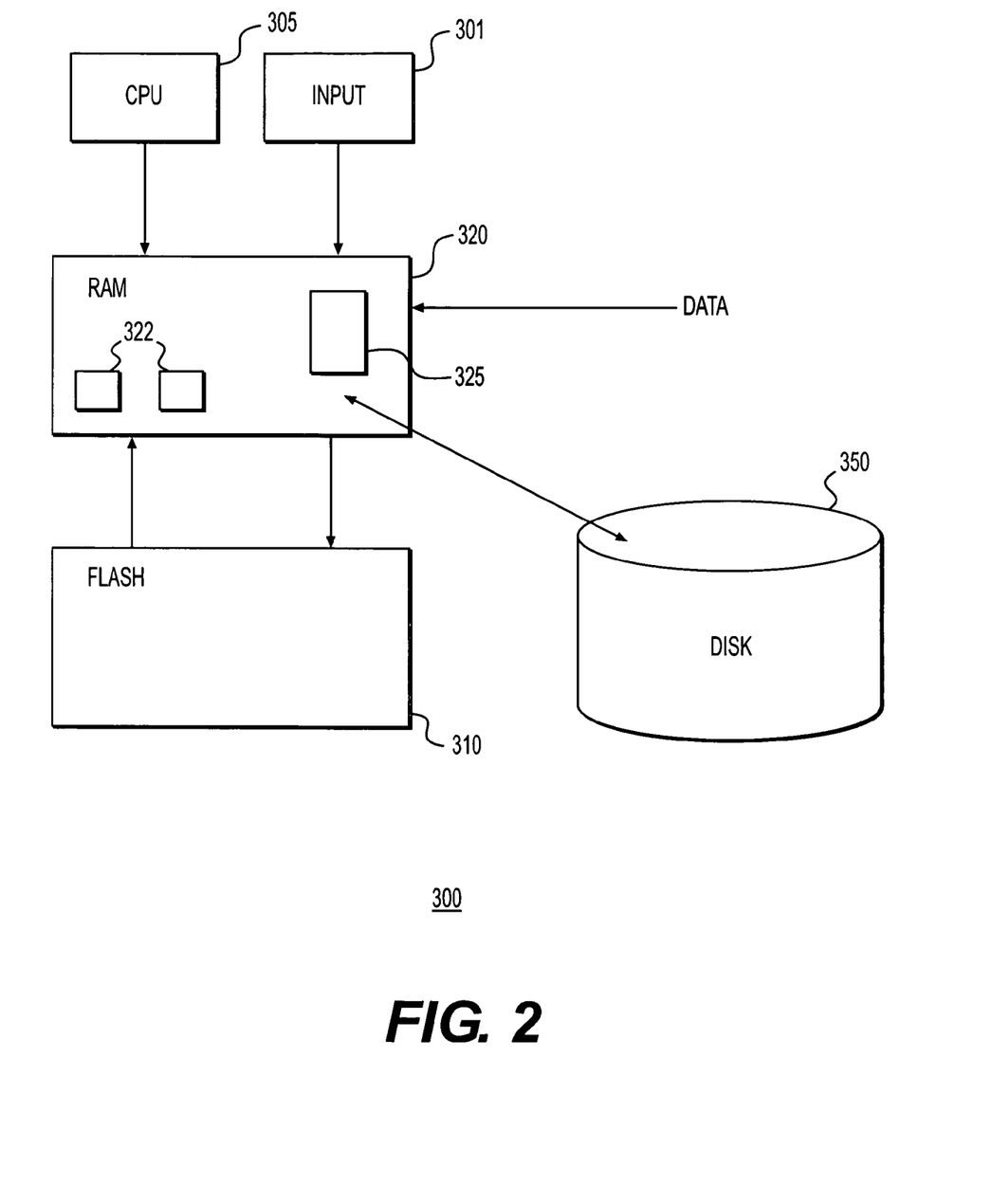
FIG. 2 illustrates an exemplary system in which sorting with flash memory is implemented.

FIG. 2 illustrates an exemplary system 300 in which sorting with flash memory is implemented. In FIG. 2, the system 300 includes CPU 305 which receives inputs 301 (from a human user or another machine), flash memory 310, RAM 320, and external disk 350. The disk 350 and memory 320 communicate by direct memory access (DMA). Communication between the disk 350 and the flash memory 310 may be by way of the memory 320. In other embodiments of a multiple hierarchy memory system, each memory layer may have direct communication with some or all other memory layers.

FIG. 2 shows the flash memory 310 as a single device. However, multiple such flash memory devices may be combined to form an overall flash memory.

The memory 320 may include one or more small input buffers 322 and one or more large output buffers 325. The memory 320 may receive unsorted data 302 and, under control of the CPU 305, perform various sort and merge operations on the input data 302.

If during a merge-sort operation, the volume of the unsorted data 302 is too large for a traditional in-memory sort using the RAM 320 only, yet sufficiently small to fit on the available flash memory 310, an external merge sort algorithm may be used, as will be described below. Because of the fast latency available in the memory hierarchy of FIG. 2, there is little incentive to employ large transfers or pages, and small pages, for example, 4 KB, are entirely appropriate for data transfer between flash and RAM.

If the size of the input data 302 exceeds the available capacity of the flash memory 310, runs on disk may be employed, with initial runs on the flash memory 310 merged to form initial runs on the disk 350. The size of runs on disk 350 may be similar to the available capacity of the flash memory 310.

Using a different page size for flash memory 310 and disk 350 takes advantage of the fast access latency of flash devices and the fast bandwidth of disk devices. Furthermore, a small page size in flash memory 310 permits a high fan-in. With a high fan-in, even if memory 320 is small, the initial runs on disk 350 will be much larger than the available memory 320 and the small runs on flash 310.

When the input data are originally moved to memory 320 and sorted, if a capacity of the memory 320 is exceeded, the amount of data that constitutes the excess may be moved to the flash memory 310. Similarly, when moving data to the flash memory 310, if a capacity of the flash memory is exceeded, the amount of data constituting the excess is moved to the disk 350. Thus, the system 300 of FIG. 2 limits the "expense" of moving unnecessary data quantities among different memory layers.

Space in the memory 320 may be allocated based on page size between merge input and merge output. For example, half of the available memory in the RAM 320 might be dedicated to buffering merge output so as to enable large disk transfers.

The merge bandwidth is limited by the slower of input and output. Two techniques maybe used to match bandwidth and thus improve overall performance. First, the flash memory 310 remains far from full such that wear leveling can remain effective without excessive overhead for creation of free space. In other words, flash capacity is traded for performance.

Second, to match input and output bandwidth, the number of flash devices is a small multiple of the number of disks. Organization of flash devices as an array can be hidden within a hardware device or may be provided by the operating system or the database management system.

The final sort output is produced merging all runs on disk. Ideally, the availability of flash memory is exploited such that the merge operation benefits from both the fast access latency of flash memory and the fast transfer bandwidth of traditional disks.

If the merge operation from flash to disk may be viewed as "assembling" large disk runs from small runs on flash, merging runs on disk may be viewed as the opposite, i.e., "disassembling" large disk runs. Specifically, large disk pages are moved from disk to flash memory, if necessary via memory (if no disk-to-flash DMA is available). This move exploits the fast disk bandwidth and requires flash arrays and internal organization with matching bandwidth.

These large pages on disk are divided into small pages on flash, which are further moved to memory 320 to be merged with a high fan-in, thus exploiting the fast access latency of flash memory. To enable this "disassembly," the large pages on disk are organized as groups of small pages, i.e., each small page contains an appropriate page header and indirection information for variable-length records, for example.

Figure 3A:
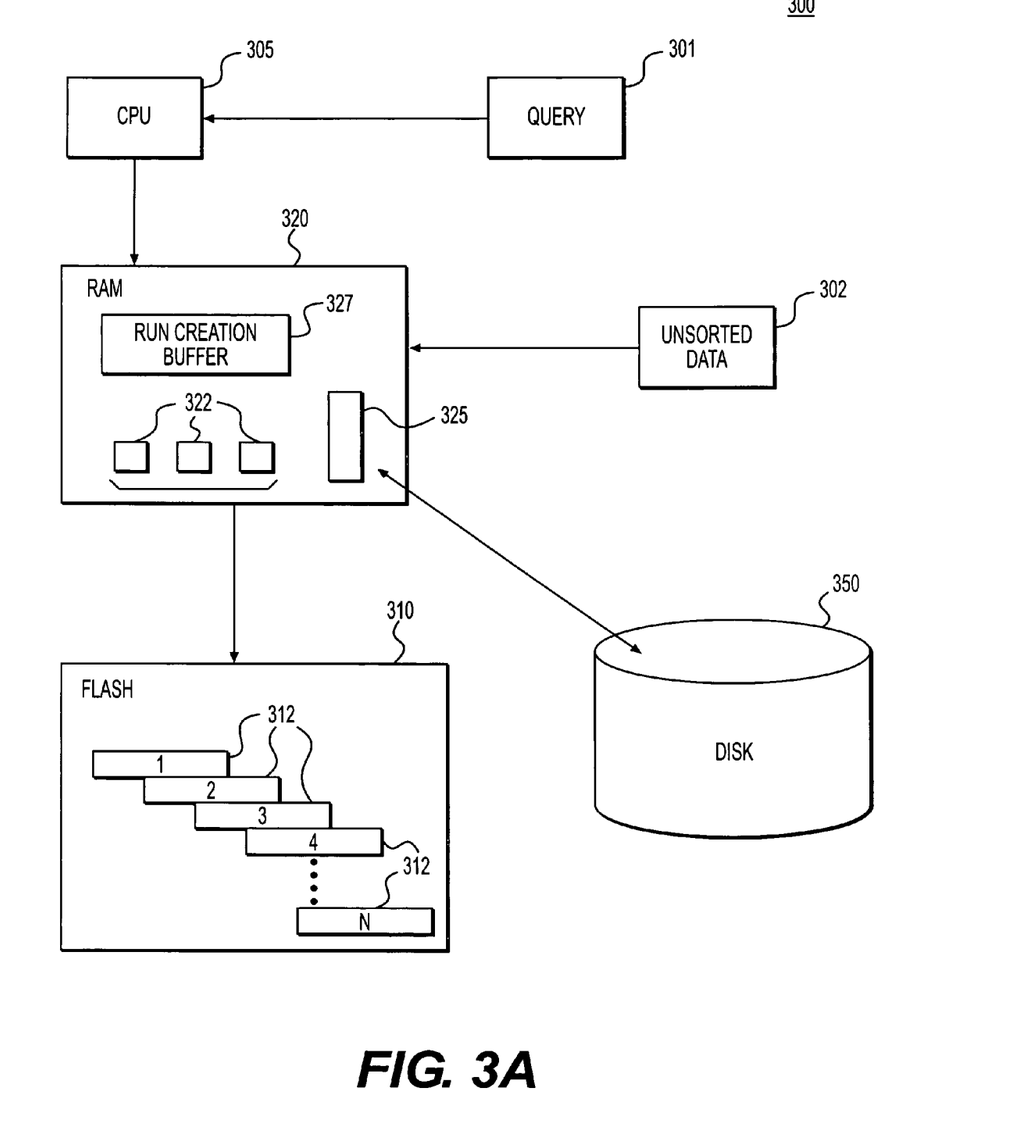
FIGS. 3A-3C illustrate an exemplary merge-sort process capable of execution on the system of FIG. 2.
Figure 3B:
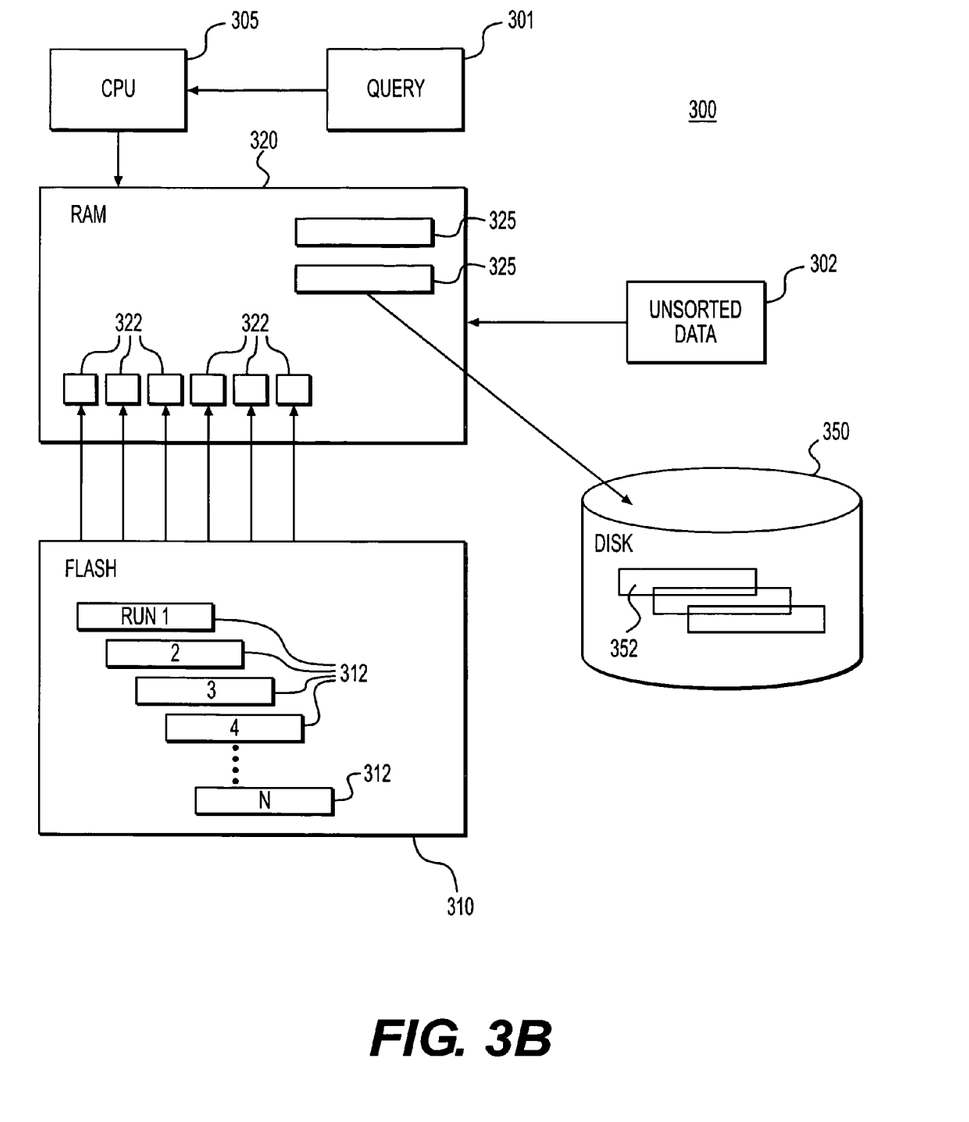
Figure 3C:
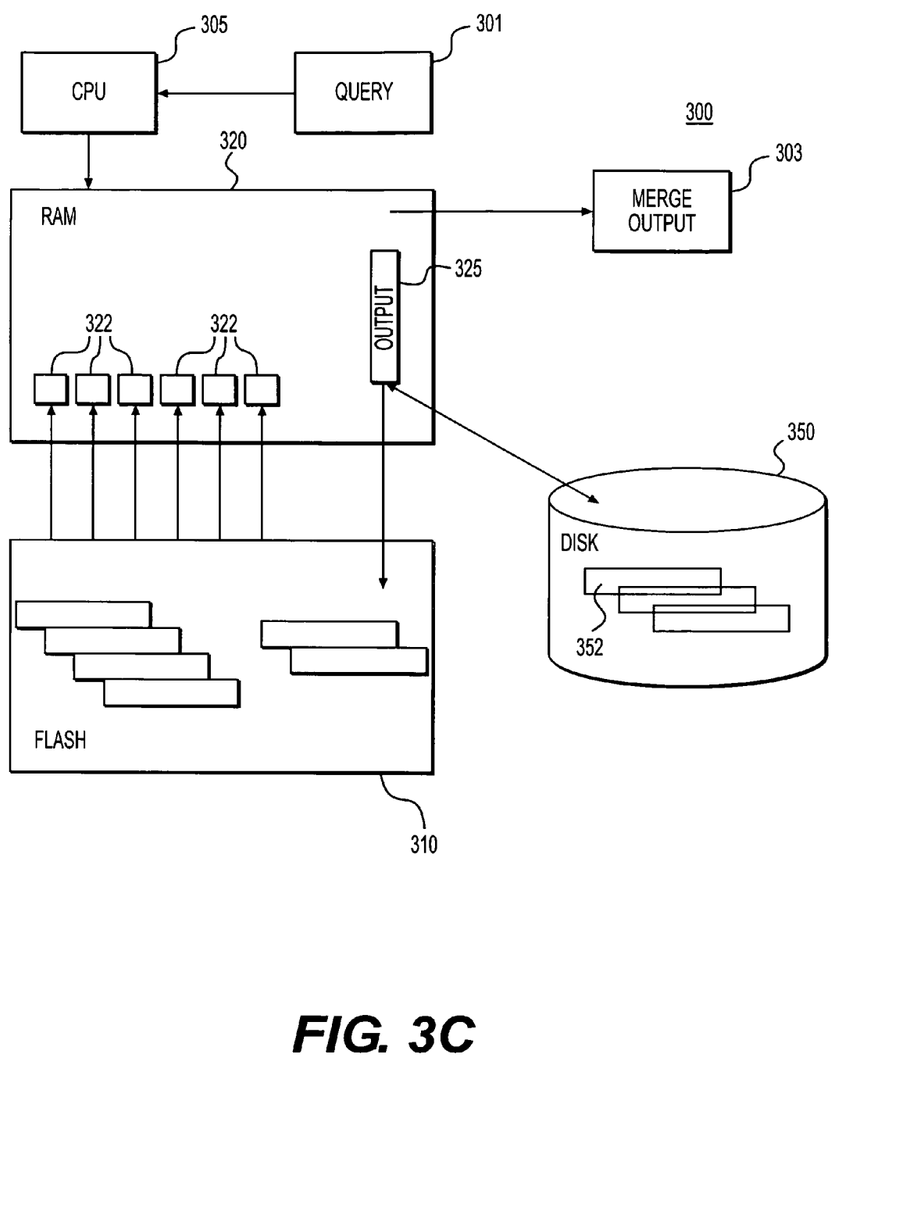

FIGS. 3A-3C illustrate an exemplary merge-sort process that may be executed on the system 300. The merge-sort process involves merging from flash memory 310 to disk 350, and run generation on disk by means of merging memory-sized runs gathered on flash memory 310. Turning to FIG. 3A, RAM 320 receives unsorted data 302. Under control of the CPU 305, the unsorted data 302 is sorted into a number of small runs 312 to be stored on flash memory 310.

FIG. 3B illustrates sort output formed from runs on disk. The runs 312 on flash memory 310 comprise multiple pages, with page size optimized (at about 4 KB, for example) for transfer to memory 320. A merge operation in memory 320 begins with fetches of small pages from flash memory 310 and stores one such page in a small buffer 322. When the buffers 322 are filled, the pages are merged and stored in large output buffer 325. The large buffer 325 then is used to move merged runs from memory 320 to disk 350 to produce large runs on disk 350. The process of merging and forming large runs on disk 350 continues until all data from flash memory 310 has been transferred to the runs on disk 350.

Turning to FIG. 3C, with the initial runs on disk 350, a merge operation commences with a transfer of the runs on disk to the large buffer 325 in memory 320. From the buffer 325, the data are "disassembled" into small runs on flash memory 310. Finally, the small runs 312 on flash memory 310 are transferred to the buffers 322 in memory 320 and then merged to produce merged output 303.

The sort and merge algorithms used in connection with the process illustrated in FIG. 3A-3C combine the fast transfer bandwidth of disks with the fast access latency of flash memory into efficient sort operations for large inputs using a small memory. To improve on the efficiency of the transition from run generation phase to merge phase, or from a sort operation's input phase to its output phase, and to account for the situation where the data input is only slightly larger than the available capacity of flash memory, other techniques may be used. For optimal robustness with unknown data input sizes, a sort phase may be configured to write only as much data from memory to flash as is required to make space for additional data input. This configuration provides a minimal "spill over" of data from one level of the memory hierarchy to the next. Similarly, the merge phase can be configured so as to merge as much data from flash to disk as is required to make space on flash for additional data from memory.

Figure 4A:
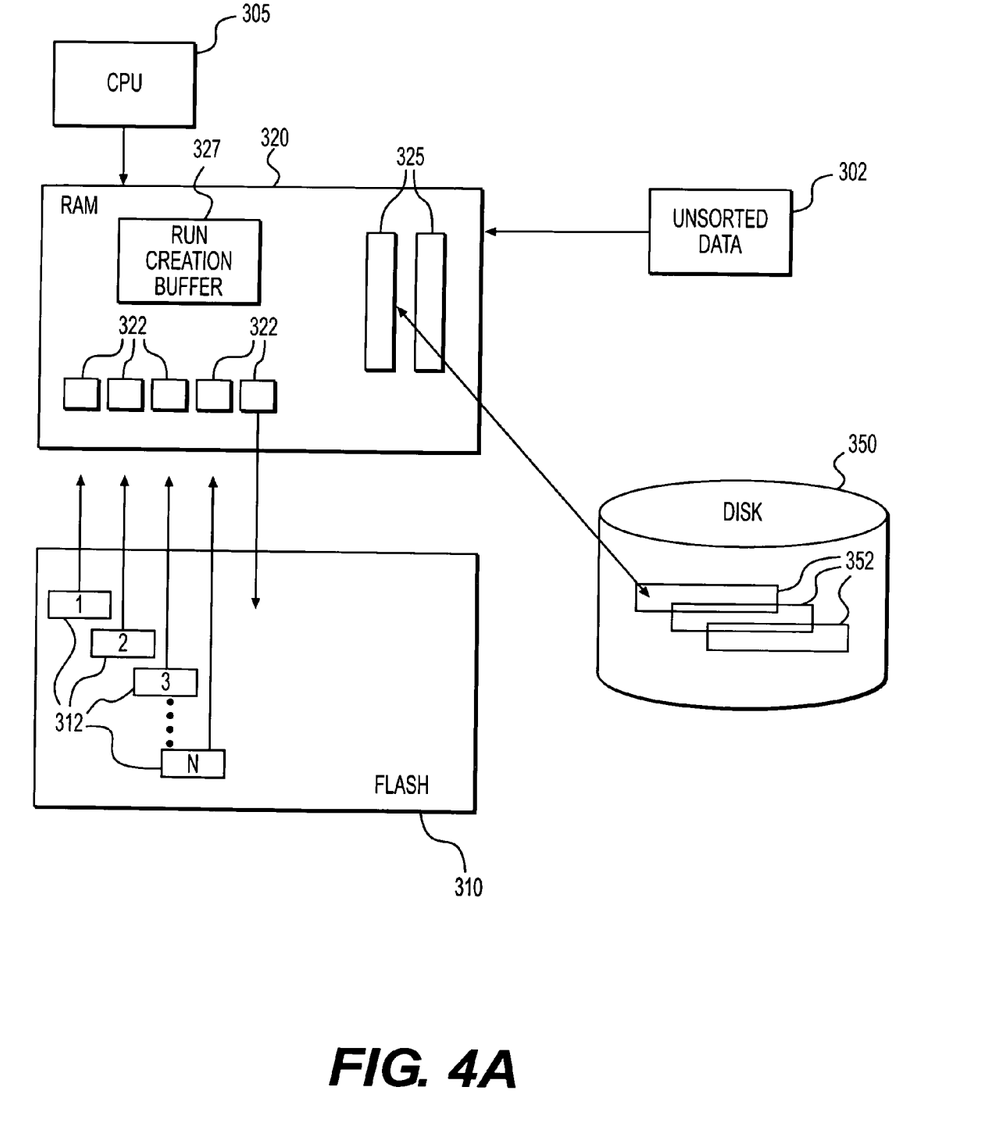
FIGS. 4A and B illustrate another exemplary merge sort process capable of execution on the system of FIG. 2 in which merge and sort functions are interleaved.
Figure 4B:
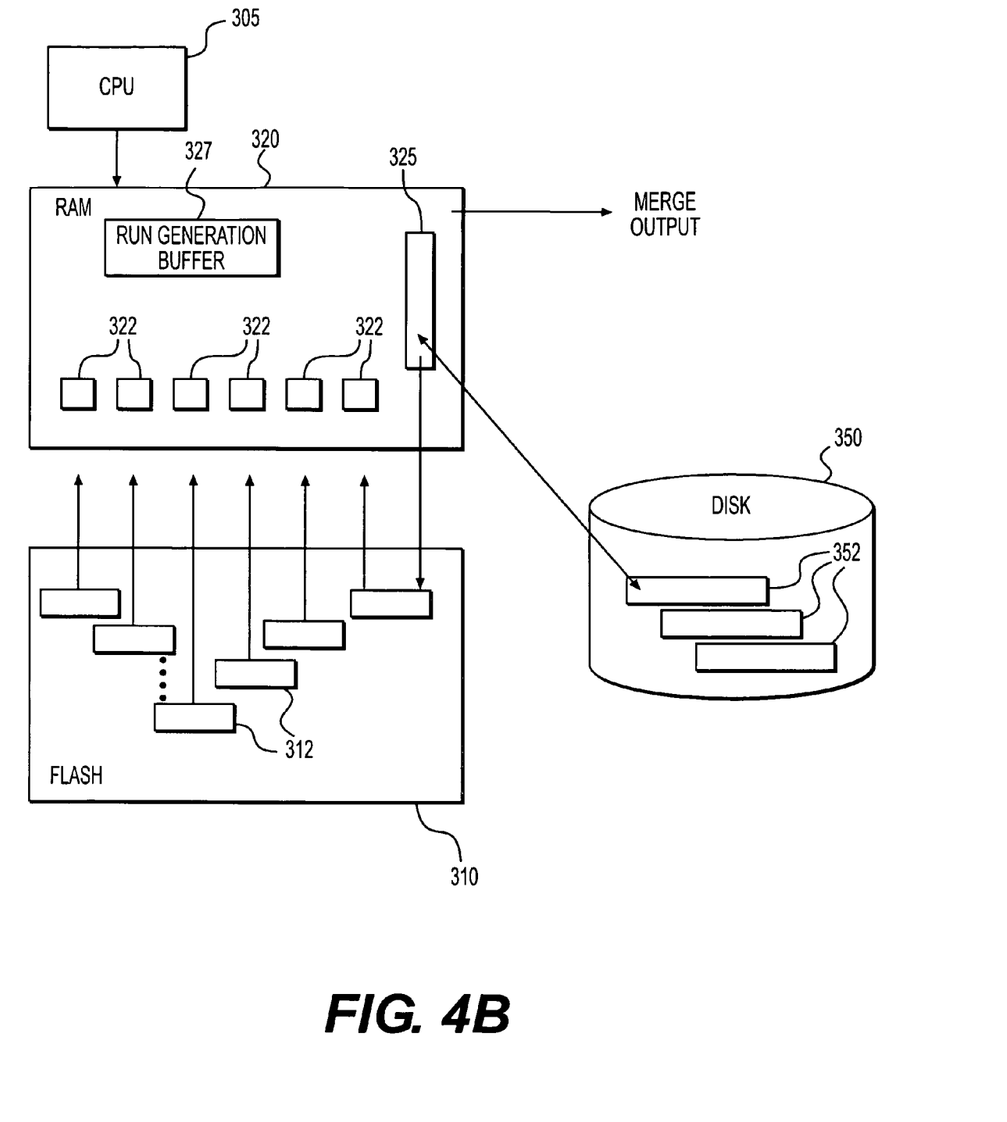

FIGS. 4A and 4B illustrate another exemplary merge-sort process that may be executed on the system 300. In FIGS. 4A and 4B, the system 300 is configured to accommodate a limited "spill over" (sort phase) of data from one memory hierarchy to another, and a subsequent minimum merge phase operation over the range of memory hierarchies. Referring to FIG. 4A, using an in-memory priority queue 327, unsorted input data 302 goes to small sorted runs 312 on flash memory 310. Multiple small runs 312 on flash memory 310 then are merged, using the small buffers 322 and large buffers 325, to form initial runs 352 on disk 350. The small input buffers 322 and the large output buffers 325, are sized to be appropriate for optimal pages on flash and on disk. The size of runs on flash is similar to the memory size, and the size of initial runs on disk is similar to the size of the available flash memory.

This merge-sort process interleaves two data movements: from memory to flash and from flash to disk. That is, the memory 320 is used to process both the merge and sort operations simultaneously. Thus, merge and sort processes compete for memory and for bandwidth. The memory 320 is divided between the priority queue 327 employed for run generation and the buffers (322, 325) used by the merge operation forming initial on-disk runs. Transfer bandwidth to and from flash memory 310 is divided between writing due to data spilling from memory to flash and reading from flash to memory as part of the merge operation.

While keeping flash memory filled to capacity in order to minimize bandwidth contention and transfer effort may seem to be desirable, the efficiency of wear leveling is limited if space utilization in flash memory is too high. The specific tradeoffs depend on the implemented hardware techniques and performance parameters.

During the transition from run generation on disk to merging from disk, or from the sort operation's input phase to its output phase, just enough data are spilled from memory to flash and from flash to disk to enable the required merge logic. The merge logic uses space on flash memory to buffer large disk pages, and uses space in memory to buffer small pages from flash memory both from runs on flash memory and from buffered runs on disk.

FIG. 4B illustrates the data flow during the sort operation's output phase. Output is formed by merging data from three sources, namely the data retained in memory during run generation, small runs on flash memory, and large runs on disk. The large disk runs are copied to flash memory and read in small pages appropriate for flash memory. The maximal merge fan-in during this phase benefits from disassembling large disk runs and thus is similar to other large steps from flash memory.

Returning to FIG. 1, the principles described above with respect to FIGS. 3A-4B can be seen to apply equally to any hierarchical memory system, including the system 100. During the sort processes' input phase, data migrates from higher to lower storage levels, i.e., faster to slower technologies. During each such movement, run size is increased by merging. Each movement, even those among low levels, might also require space in higher levels of the memory hierarchy. The memory allocation policy balances top-level run generation with merging at multiple lower memory levels.

During the sort operation's output phase, data migrates from lower to higher storage levels. At each migration step, additional merging should increase the size of intermediate runs. Each movement of data "through" the CPU and its highest memory level should compare and rearrange records in order to contribute to the overall sort operation.

The transition from input phase to output phase continues pushing data "down" in the memory hierarchy just sufficiently to enable appropriate interleaving of merging on all levels. Merging strictly along the memory hierarchy may be efficient, but other merge paths are possible.

The highest level of the memory hierarchy contributes to all merge operations. Thus, a multi-level interleaved merge operation across a deep memory hierarchy might seem to require more space in the highest level than a shallower sort operation. However, a fast intermediate storage technology such as flash memory between traditional memory and traditional disk enables efficient sort operations with little memory dedicated to initial run generation at the highest level.

Figure 5A:
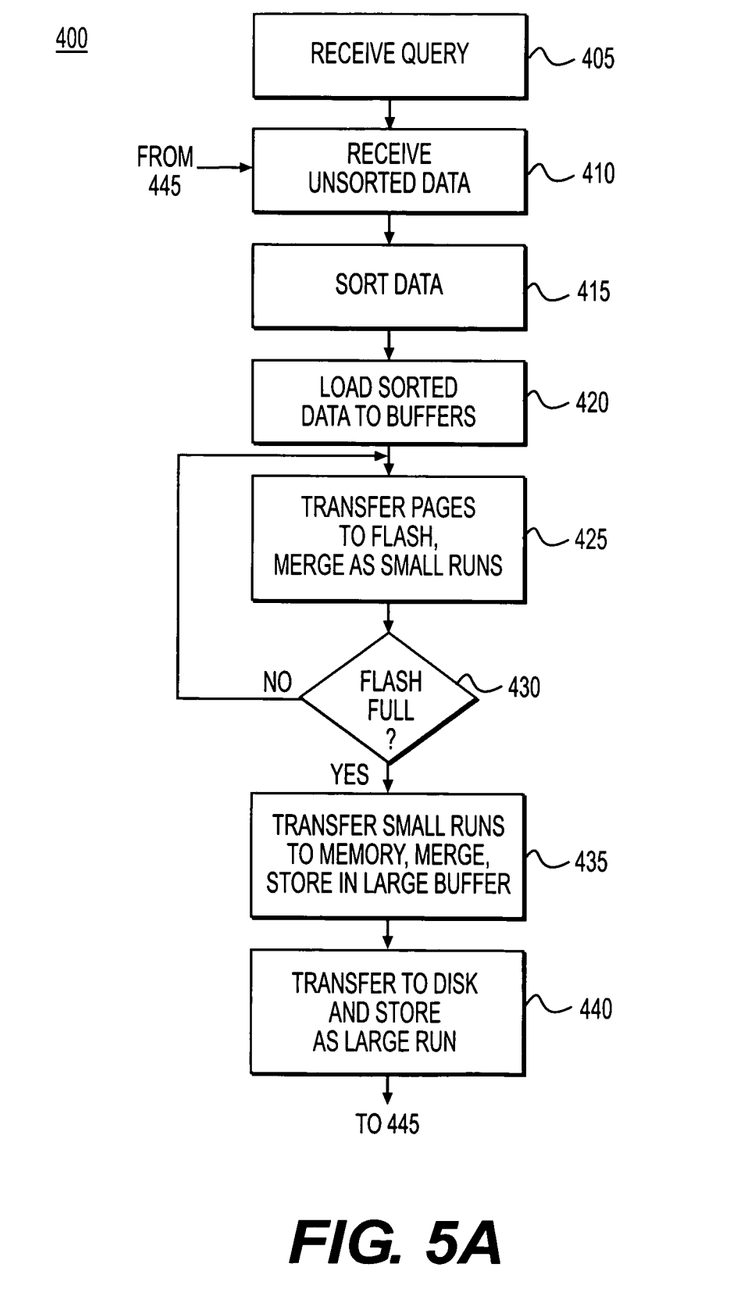
FIGS. 5A and 5B are flowcharts illustrating an exemplary merge sort process.
Figure 5B:
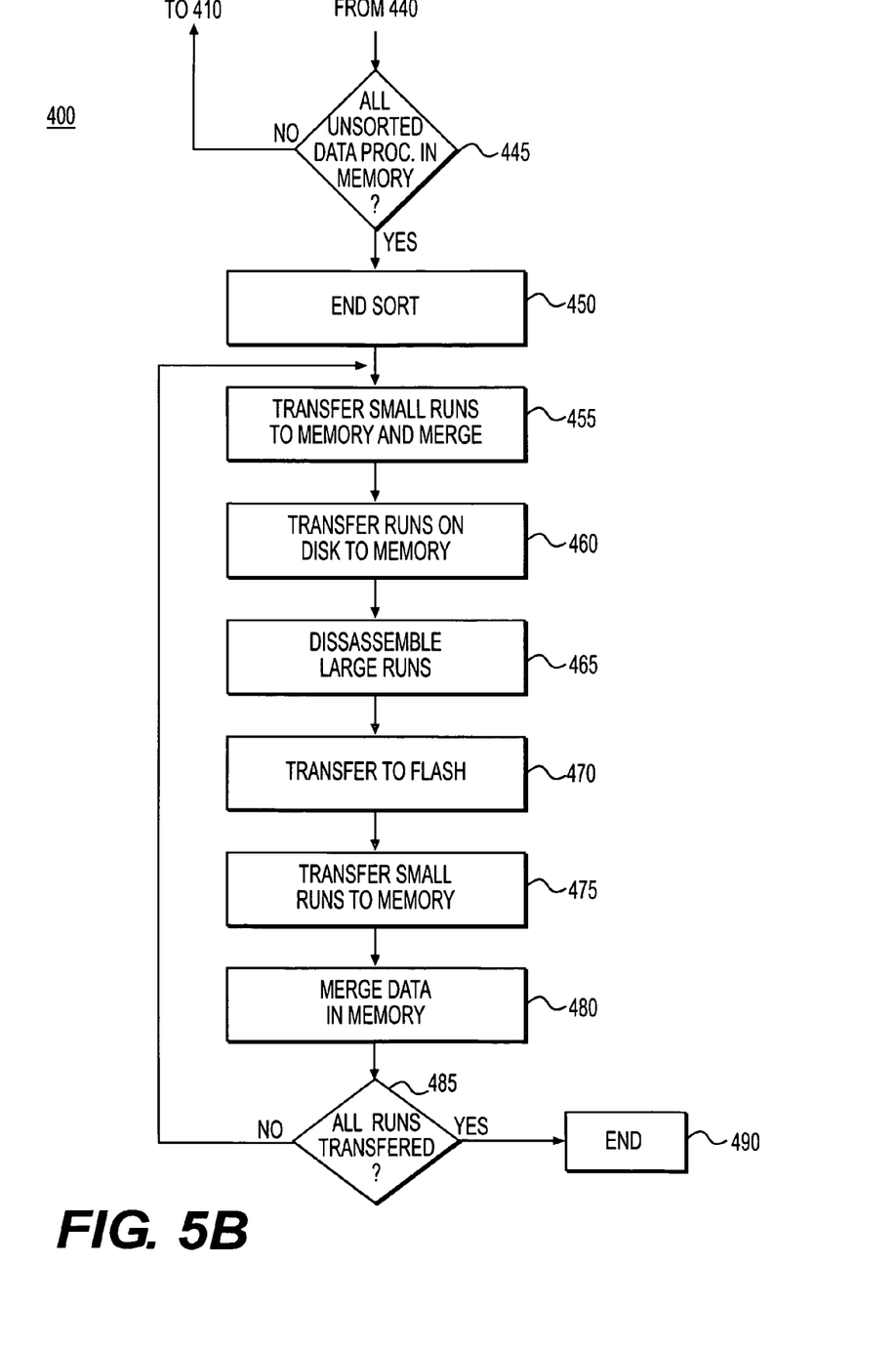

FIGS. 5A and 5B are flowcharts illustrating exemplary merge and sort operation 400 of the system 300 of FIGS. 4A and 4B. The operation 400 interleaves two phases of operation 400, namely a sort phase, where data are placed in ordered runs, and a merge phase, where sorted data are merged. The operation 400 also can be viewed as two sub-operations, namely a sort input sub-operation (FIG. 5A) and a sort output sub-operation (FIG. 5B). In FIG. 5A, the operation 400 begins at block 405 when the CPU receives a query 301 and in response initiates a request that results in the return of unsorted data 302 (block 410) into memory 320. In block 415, memory 320 space allocated to a sort function is filled, and the unsorted data 302 are ordered according to a sort algorithm. If a capacity of the memory 320 is reached, the amount of data that just exceeds the memory capacity may be moved to flash memory, and the sort process continued in memory 320.

In block 420, the sorted data are loaded into small buffers 322, with the buffer size set to optimize data transfer between memory or flash, namely at about 4 KB. The data then (block 425) are transferred to flash memory 310 and stored as small runs 312 on flash. Logic in the CPU 305 determines when flash memory capacity is reached, block 430. If flash memory capacity is not reached, the data transfer to flash continues. If flash memory capacity has been reached, a "spill over" to disk is required, and in block 435, sufficient data from the small runs 312 on flash are moved to memory 320 to be merged according to a merge algorithm. The size of the "sufficient data" is chosen so that only the excess data need be moved to disk 350. After merger, the merged data are transferred to disk 350 and retained as large runs on disk 352 (block 440). Logic in the CPU 305 continues (block 445) the process of receiving incoming, unsorted data, sorting the data, writing the sorted data to flash memory 310, and spilling the contents of flash memory 310 to disk 350 until all incoming unsorted data 302 are at least processed (sorted to create runs) in memory 320. When no more incoming unsorted data 302 remains, the sort input sub-operation ends, block 450.

The original unsorted input data 302 now lies distributed as runs in memory 320, flash memory 310, and disk 350, with the minimum amount of spill over from memory to flash, and should flash reach capacity, the minimum further spill over from flash to disk. Thus, some amount of ordered data (i.e., a run 328) is retained in memory 320. The sort output sub-operation begins at this point. In block 455, run data in the flash memory is transferred to memory 320, where it is merged by merge logic in the CPU 305, along with the run data already retained in memory 320. Runs 352 on disk 350 are transferred (block 460) as large page sizes to large buffer 325 in memory 320, "disassembled" (block 465), and transferred (block 470) to flash memory 310 as small runs 312. Data from the small runs 312 then are transferred at the appropriate page size to the small buffers in memory 320 (block 475). In block 480, the contents of the small buffers 322 are merged to form merge output 303. The sort output sub-operation continues until all data from disk, flash, and memory have been transferred and merged into the merge output 303 (block 485). The operation 400 then ends, block 490.

Note that the sort input and sort output sub-operations overlap to some extent. Moreover, the sort and merge operations executed during the sort input sub-operation are interleaved, and as such cause competition for space in memory 320 and flash memory 310, and for transfer bandwidth between memory 320 and flash memory 310, and between flash memory 310 and disk 350.

The invention claimed is:

1. A method, executed on a processor, for ordering records using a memory hierarchy, comprising:
   (a) receiving unsorted input records;
   (b) reading the input records and holding the input records in a primary memory;
   (c) sorting pages of input records to create a run;
   (d) moving data that just exceeds a capacity of the primary memory to a secondary level of the memory hierarchy;
   (e) repeating (a)-(d) until a capacity of the secondary level of the memory hierarchy is exceeded;
   (f) following (e), moving data that just exceeds the secondary memory capacity from the secondary level to a tertiary level of the memory hierarchy until the capacity of the secondary level no longer is exceeded; and
   (g) following (f), merging runs from the primary memory, the secondary level of the memory hierarchy, and the tertiary level of the memory hierarchy, to create a final sorted output, wherein the final sorted output is stored at the tertiary level of the memory hierarchy.

2. The method of claim 1, wherein data transferred to the secondary level are stored as small pages, and wherein data stored on the tertiary level are stored as large pages.

3. The method of claim 2, wherein merging the runs comprises:
   following (c), sending the run from the primary memory to an output device;
   following (e):
      transferring the small pages from the secondary level of the memory hierarchy to the primary memory and merging the small pages transferred from the secondary level in the primary memory to produce the merge output, and
      sending the merge output to the output device; and
   following (f):
      transferring large pages from the tertiary level of the memory hierarchy to the secondary level of the memory hierarchy,
      disassembling the large pages transferred from the tertiary level to the secondary level into the small pages for intermediate storage in the secondary level,
      transferring the small pages from the secondary level of the memory hierarchy to the primary memory and merging the small pages transferred from the secondary level in the primary memory to produce the merge output, and
      sending the merge output to the output device.

4. The method of claim 2, further comprising matching a size of the small pages to a size of the primary memory.

5. The method of claim 2, further comprising matching a size of the large pages to a size of the secondary level of the memory hierarchy.

6. The method of claim 1, wherein:
   the primary memory is a random access memory;
   the secondary level is a flash memory; and
   the tertiary level is a disk.

7. The method of claim 1, wherein the sort is executed using an external merge sort algorithm.

8. The method of claim 7, wherein the external merge sort algorithm is one of a distribution sort algorithm and a hash-based sort algorithm.

9. A system, comprising one or more programming modules instantiated on a processor, for ordering records using a memory hierarchy, comprising:
   receiving unsorted input records;
   reading the input records in pages and writing one or more pages of the input records to the primary memory;
   sorting the pages of input records to create a run;
   when a size of the run exceeds primary memory capacity, moving just an amount of data exceeding the primary memory capacity to a secondary level of the memory hierarchy;
   moving an excess of data from the secondary level to a tertiary level of the memory hierarchy when the capacity of the secondary level is exceeded; and
   merging the runs from the primary memory, the secondary level of the memory hierarchy, and the tertiary level of the memory hierarchy to create a merge output, wherein unsorted input records have been read into one or more of the primary memory, the secondary level of the memory hierarchy or the tertiary level of the memory hierarchy.

10. The system of claim 9, wherein transferring data from the secondary level to the tertiary level of the memory hierarchy transfers only as many runs as exceed a capacity of the secondary level of the memory hierarchy.

11. The system of claim 9, further comprising:
transferring large pages from the tertiary level of the memory hierarchy to the secondary level of the memory hierarchy;
disassembling the large pages transferred from the tertiary level to the secondary level into small pages for intermediate storage in the secondary level;
transferring the small pages from the secondary level of the memory hierarchy to the primary memory and merging the small pages from the secondary level in the primary memory to produce the merge output; and
sending the merge output from the primary memory to an output device.

12. The system of claim 9, wherein:
the primary memory is a random access memory;
the secondary level is a flash memory; and
the tertiary level is a disk.

13. The system of claim 9, wherein the sort is executed using an external merge sort algorithm.

14. The system of claim 13, wherein the external merge sort algorithm is one of a distribution sort algorithm and a hash-based sort algorithm.

15. The system of claim 11, further comprising matching a size of the small pages to a size of the primary memory.

16. The system of claim 11, further comprising matching a size of the large pages to a size of the secondary level of the memory hierarchy.

17. A method, implemented on a programmed device, for ordering records, comprising:
(a) reading an input data stream of records;
(b) sorting and storing the records in a primary memory device of a memory hierarchy as a first run;
(c) transferring, when a capacity of the primary memory device is exceeded, a portion of the first run to a secondary memory device of the memory hierarchy and storing the transferred portion of the first run in the secondary memory device;
(d) transferring, when a capacity of the secondary memory device is exceeded, data from the secondary memory device to a tertiary memory device of the memory hierarchy and storing the transferred data;
(e) repeating (a)-(d) until all records are sorted and stored in the memory hierarchy; and
(f) executing a merge operation of the stored data from the primary memory device, the secondary memory device, and the tertiary memory device to produce a merge output of the records, wherein the merge output is stored at the tertiary memory device.

18. The method of claim 17, wherein a size of the data retained on the secondary memory device approximates the capacity of the primary memory device.

19. The method of claim 17, wherein a size of the data retained on the tertiary memory device approximates the capacity of the secondary memory device.

20. The method of claim 17, wherein executing the merge operation comprises:
transferring third runs from the tertiary memory device to the secondary memory device,
disassembling the third runs to produce second runs for intermediate storage in the secondary memory device,
transferring the small runs from the secondary memory device to the primary memory device and merging the small runs to produce the merge output; and
sending the merge output to an output device.

* * * * *